Figure 1:
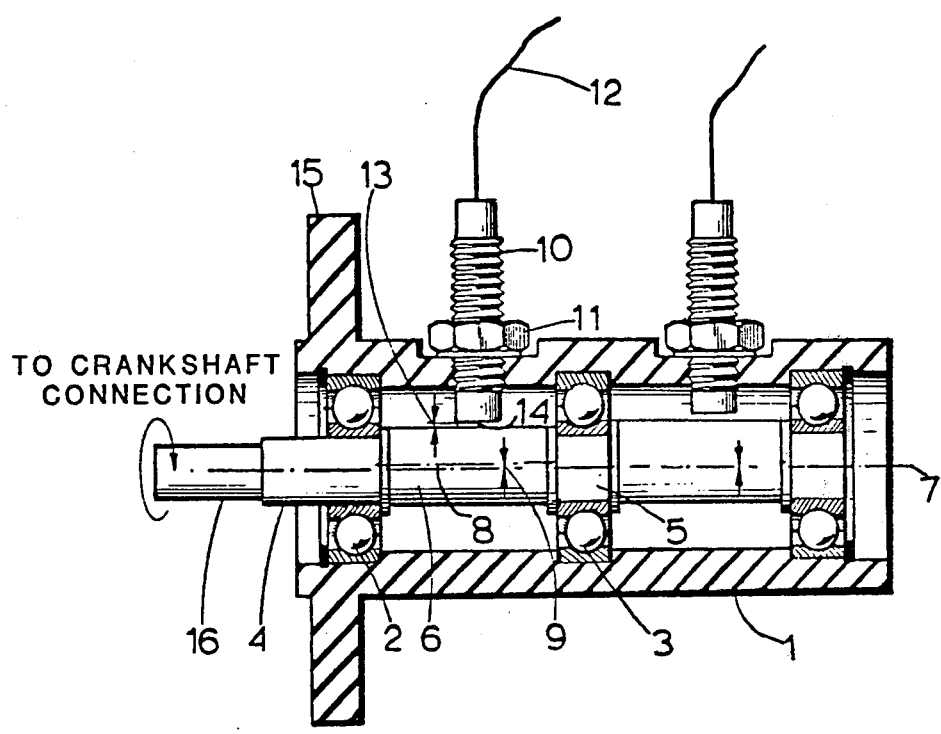

United States Patent [19]

Klimstra

[11] 4,401,946
[45] Aug. 30, 1983

[54] PISTON POSITION DETECTOR HAVING A METAL CYLINDER ROTATING ABOUT AN ECCENTRIC AXIS

[75] Inventor: Jacob Klimstra, Buitenpost, Netherlands

[73] Assignee: N.V. Nederlandse Gasunie, Groninger, Netherlands

[21] Appl. No.: 186,597

[22] Filed: Sep. 12, 1980

[30] Foreign Application Priority Data

Sep. 12, 1979 [NL] Netherlands .................. 7906791

[51] Int. Cl.³ .................. G01B 7/14; G01P 3/54
[52] U.S. Cl. .................. 324/208; 123/414; 324/166
[58] Field of Search .......... 324/207, 208, 160, 166, 324/173, 174, 163, 164, 167, 168; 123/414, 612, 614, 617

[56] References Cited

U.S. PATENT DOCUMENTS 3,491,289  1/1970  Petrini .................. 324/208
4,284,916  8/1981  Onodera et al. .......... 324/174

Primary Examiner—Gerard R. Strecker
Assistant Examiner—Walter E. Snow

[57] ABSTRACT

Piston position detector for generating an electrical signal varying linearly with piston travel of a piston machine. The device comprises a metal cylinder rotating about an eccentric axis synchronously with the crankshaft of the piston machine, the ratio of eccentricity to cylinder radius being substantially equal to the ratio of crank length to connecting rod length of the piston machine. The cylinder surface is faced by the probe of an eddy-current distance meter, the arrangement being such that the desired linear relation is obtained.

6 Claims, 1 Drawing Figure

PISTON POSITION DETECTOR HAVING A METAL CYLINDER ROTATING ABOUT AN ECCENTRIC AXIS

The invention relates to a device for generating an electrical signal whose magnitude varies in substantially linear relation to the distance at which a piston in a piston machine is from its outer dead centre, which device is equipped with a rotatable part having a circular circumference which can rotate together with or synchronously with the crankshaft of the piston machine about an axis of rotation eccentric to said circular circumference.

Devices of this kind are used, for instance, for taking indicator diagrams of high-speed piston machines by means of a cathode-ray oscillograph. The device then provides the signal by means of which the required horizontal displacement of the spot, in linear relation to the piston travel, can be effected on the oscillograph screen; the vertical displacement of the spot is effected by means of a rapid-response pressure sensor, e.g. one of the capacitive type, which provides an electrical signal proportional to the pressure in the cylinder.

From the German 'Auslegeschrift' No. 1.172.863 a device is known the rotatable part of which is a circular plate rotating about an eccentric axis which forms one of the plates of a capacitor. In a fixed position parallel to this circular plate is a small rectangular plate forming the second capacitor plate, arranted in such a way that the capacitance of the resulting capacitor varies in linear relation to the piston travel. A measuring circuit converts the capacitance variations into a voltage output signal. Capacitive devices of this kind do not come up to present-day standards of accuracy.

The object of the invention is to provide a device of the type outlined which is both simple and accurate.

The device according to the invention is characterized in that the said rotatable part is a cylindrical metal part having its cylinder axis eccentricaly parallel to its axis of rotation, with the ratio of eccentricity to cylinder radius being substantially equal to the ratio of crank length to connecting-rod length in the piston machin, and with an eddy-current distance meter being provided for determining without resort to contact, the distance between a fixed point and the surface of the said cylindrical metal part, measured along the line from the said fixed point normal to the axis of rotation, this fixed point being in such a position that the said distance has its maximum or minimum value when the said piston is in the said outer dead centre.

Correct positioning of the 'fixed point' can be achieved either by moving this point itself (e.g. by turning the entire device) or by varying the angular position of the rotatable part relative to the crankshaft of the machine. 'Outer dead centre' is here used to denote the dead centre in which the piston is farthest removed from the crankshaft.

Accurate eddy-current distance meters can be obtained commercially. They are widely used for studying vibrations in machines. An eddy-current distance meter consists of a coil embedded in a plastic—the probe—which receives a high-frequency alternating current from a control circuit. This causes the probe to excite an alternating magnetic field. Eddy currents will be generated in a suitable material placed in this field. The energy required for this is drawn from the magnetic field. This causes a variation of the current supplied to the coil by the control circuit. The ensemble is so adjusted that the output voltage of the control circuit is directly proportional to the width of the gap between probe and object. The sensitivity of eddy-current distance meters is, for instance, 200 mV/mil, or 7.87 mV/$\mu$m.

The invention is elucidated with reference to the drawing, which shows a longitudinal section of an embodiment of the device according to the invention, by way of non-restrictive example.

A house 1 contains a rotatable part mounted in roller bearings 2 and 3, which consists of two shaft sections 4 and 5 fastened in the bearings 2 and 3, with, between them, an eccentric cylindrical part 6. Reference number 7 refers to the axis of rotation, 8 to the cylinder axis of the cylindrical part 6, and 9 to the eccentricity of the cylindrical part 6. Screwed into a threaded opening in housing 1 is an eddy-current probe 10, secured by a lock nut 11. A connecting line 12 connects the probe 10 to a control circuit (not shown) which converts the signal emitted by the probe into a voltage proportional to the distance 13 between the centre 14 of the probe and the surface of cylinder 6. Point 14 here is the 'fixed point' referred to above. The ensemble can be fixed, e.g. by means of bolts in slot-shaped bolt holes, to, e.g., a piston machine to be examined or to a special bracket. The shaft end 16 can be coupled to the crankshaft of the piston machine in any suitable way.

The drawing shows the embodiment practically in its actual size. This particular embodiment was designed for use with a piston machine in which the ratio of crank length to connecting-rod length is 1 to 7. The diameter of the cylindrical part is 11.6 mm, the radius, consequently, 5.8 mm. The eccentricity, reference number 9, amounts to 1/7 of this radius, i.e. 0.83 mm. Probe 10 with the associated control circuit is type M60-1 made by DYMAC. The output signal from the control circuit varies from 3.23 V to 16.36 V through a full stroke of the piston. The deviation from linearity of the relation between the path travelled by the piston from the outer dead centre and the signal nowhere exceeds about 1%.

A device according to the invention can be made suitable for use with several piston machines with different ratios of crank length to connecting-rod length by providing it with two probes and with two cylindrical parts in line having the corresponding ratios of eccentricity to radius. If maximum accuracy is not required and an additional error of not more than 1% is acceptable, such a device, provided with cylindrical parts having eccentricity-to-radius ratios of 1/7 and 1/10, can, as has been found, even be used for piston machines having any ratio of crank length to connecting-rod length between 1/6 and 1/11.

I claim:

1. Device for generating an electrical signal whose magnitude varies in substantially linear relation to the distance at which a piston in a piston machine is from its top dead centre, which device is provided with a rotatable part having a circular circumference which can rotate with the crank shaft of the piston machine about an axis of rotation eccentric to said circular circumference, characterized in that the said rotatable part is a cylindrical metal part having its cylinder axis parallel to but eccentrically offset from its axis of rotation, with the ratio of eccentricity to cylinder radius being substantially equal to the ratio of crank length to connecting-rod length in the piston machine and with an eddy-current distance meter being provided for determining, without resort to contact, the distance between a fixed point and the surface of the said cylindrical metal part, measured along the line from the said fixed point normal to the axis of rotation, this fixed point being in such a position that the said distance has a predetermined value, said predetermined value being at a maximum or a minimum when said piston is in its top dead centre position.

2. Device according to claim 1, characterized in that the device is provided with at least two of said rotatable parts having different ratios of eccentricity to radius with each rotatable part having an eddy-current distance meter operatively associated therewith.

3. A device for use with a piston machine including a crank shaft and at least one piston connected thereto by a connecting rod for generating a signal whose magnitude varies in a substantially linear manner with respect to the distance at which said piston is from its top, dead center position, said device including a housing in which a shaft is rotatably retained, said shaft being operatively engaged with said crank shaft so that it will rotate therewith, said shaft having at least a first cylindrical eccentric portion having an axis of rotation eccentrically parallel to the axis of said shaft, wherein the degree of eccentricity is substantially equal to the ratio of crank length to connecting rod length times the radius of said first cylindrical eccentric portion, said device further including an eddy-current distance meter provided with a probe secured within said housing perpendicularly to the axis of said shaft so that said probe is positioned a predetermined distance away from said first cylindrical eccentric portion, said eddy-current distance meter determining the distance between said probe and the surface of said first eccentric portion, said distance having a predetermined value for each position of the piston along its path of travel, said predetermined value being at a maximum or a minimum when said piston is in its top, dead center position.

4. A device as in claim 3, wherein said shaft includes a plurality of spaced apart cylindrical eccentric portions and wherein a like plurality of eddy-current distance meters are mounted in said housing so that each is operatively positioned with respect to one of said plurality of cylindrical eccentric portions.

5. A device as in claim 4, wherein each of said plurality of eccentric portions has a different eccentricity-to-radius ratio.

6. A device as in claim 3 wherein said shaft rotates synchronously with said crank shaft.

* * * * *